(12) United States Patent
Ueoka

(10) Patent No.: US 10,269,200 B2
(45) Date of Patent: Apr. 23, 2019

(54) PAPER SHEET THICKNESS DETECTING SENSOR AND BANKNOTE CLASSIFYING UNIT

(71) Applicant: FUJITSU FRONTECH LIMITED, Tokyo (JP)

(72) Inventor: Tadashi Ueoka, Inagi (JP)

(73) Assignee: Fujitsu Frontech Limited, Tokyo (JP)

(*) Notice: Subject to any disclaimer, the term of this patent is extended or adjusted under 35 U.S.C. 154(b) by 0 days.

(21) Appl. No.: 15/729,949

(22) Filed: Oct. 11, 2017

(65) Prior Publication Data

US 2018/0047238 A1 Feb. 15, 2018

Related U.S. Application Data

(63) Continuation of application No. PCT/JP2015/062376, filed on Apr. 23, 2015.

(51) Int. Cl.
*G01V 3/00* (2006.01)
*G07D 7/164* (2016.01)
(Continued)

(52) U.S. Cl.
CPC .............. *G07D 7/164* (2013.01); *B65H 7/06* (2013.01); *G01B 7/06* (2013.01); *G07D 7/02* (2013.01);
(Continued)

(58) Field of Classification Search
CPC ..... F15B 15/2869; G01B 15/02; G01B 7/023; G01D 5/48; G01D 5/202; G01N 22/00; G01N 22/02
(Continued)

(56) References Cited

U.S. PATENT DOCUMENTS

2003/0053089 A1\* 3/2003 Nojiri .................... G01N 29/12
358/1.9
2007/0194878 A1\* 8/2007 Touge .................... G01S 7/282
340/5.2
(Continued)

FOREIGN PATENT DOCUMENTS

EP 0 097 570 A2 1/1984
JP 02-98605 A 4/1990
(Continued)

OTHER PUBLICATIONS

Int'l. Search Report issued in Int'l. App. No. PCT/JP2015/062376, dated Jul. 28, 2015.

*Primary Examiner* — Jermele M Hollington
*Assistant Examiner* — Raul Rios Russo
(74) *Attorney, Agent, or Firm* — Greer Burns & Crain Ltd.

(57) ABSTRACT

A paper-sheet-thickness detecting sensor of the present invention includes: an oscillator that outputs high-frequency signals with frequencies corresponding to positions in a horizontal direction that is orthogonal to a direction in which a paper sheet is transported; a signal electrode to which the high-frequency signals output by the oscillator are applied; a plurality of detection electrodes that face the signal electrode across a transportation path for the paper sheet and that individually detect detection signals that correspond to the positions; a plurality of resonance circuits that each have one end connected to one end of each of the plurality of detection electrodes and that have resonance frequencies equal to the frequencies allocated to the positions; and a broadband amplifier to which another end of each of the plurality of resonance circuits is connected and that outputs outputs of the plurality of resonance circuits as one piece of sensor output information.

11 Claims, 10 Drawing Sheets

(51) Int. Cl.
*B65H 7/06* (2006.01)
*G01B 7/06* (2006.01)
*G07D 7/02* (2016.01)
*G07D 7/16* (2016.01)
*G07D 7/162* (2016.01)
*G07D 7/183* (2016.01)
*G07D 7/189* (2016.01)
*B65H 29/20* (2006.01)

(52) U.S. Cl.
CPC ............... *G07D 7/16* (2013.01); *G07D 7/162* (2013.01); *G07D 7/183* (2017.05); *G07D 7/189* (2017.05); *B65H 29/20* (2013.01)

(58) Field of Classification Search
USPC .......... 324/76.11–76.83, 459, 600, 629, 633, 324/635; 7/2, 20, 125
See application file for complete search history.

(56) References Cited

U.S. PATENT DOCUMENTS

| | | |
|---|---|---|
| 2010/0117295 A1 | 5/2010 | Miyamoto |
| 2011/0293311 A1* | 12/2011 | Nemoto ............. G03G 15/5004 399/88 |
| 2011/0309572 A1 | 12/2011 | Miyamoto |

FOREIGN PATENT DOCUMENTS

| | | |
|---|---|---|
| JP | 04-279801 A | 10/1992 |
| JP | 05-052504 | 3/1993 |
| JP | 2012-160060 A | 8/2012 |
| WO | WO 2009/013787 A1 | 1/2009 |

\* cited by examiner

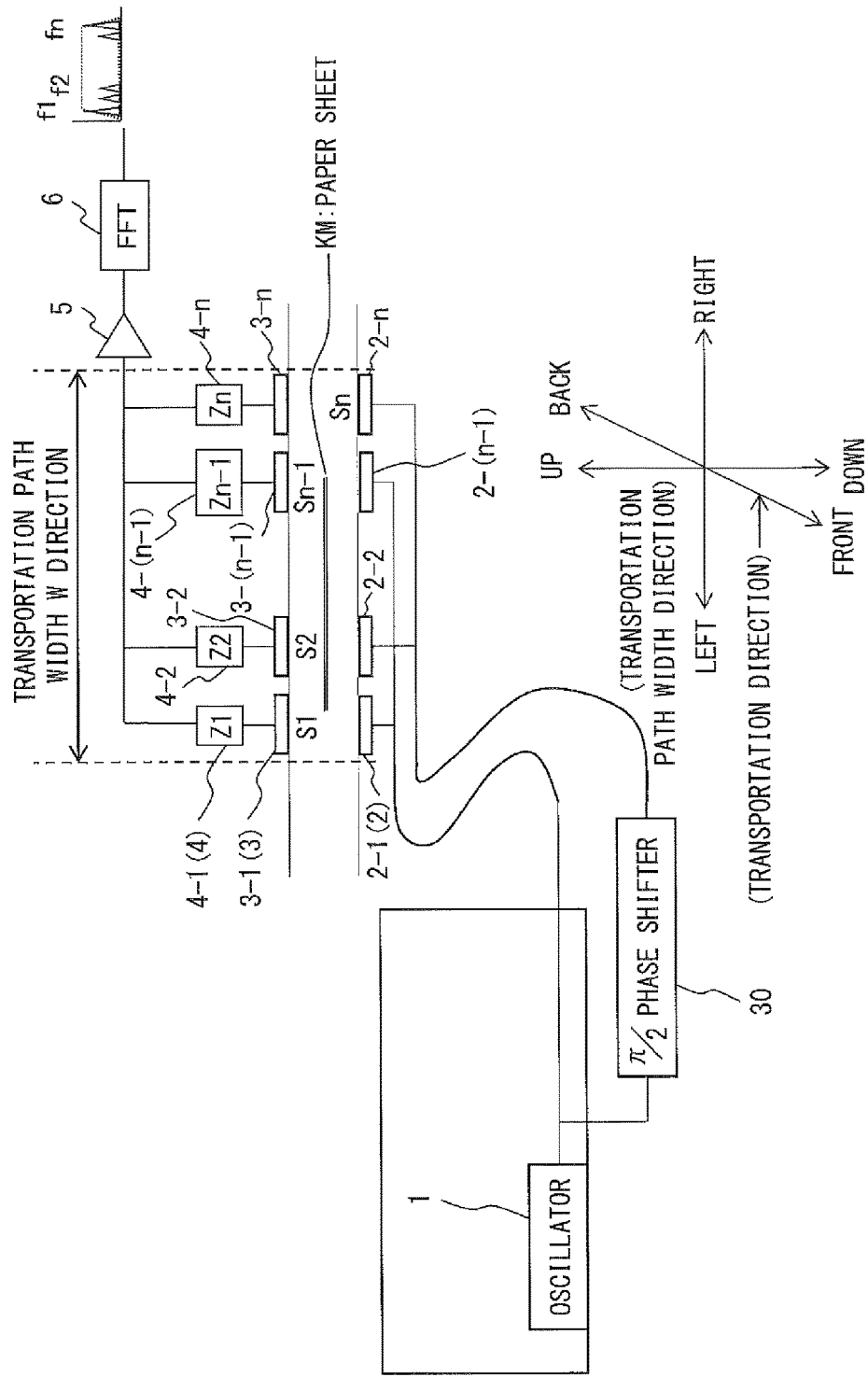
F I G. 5

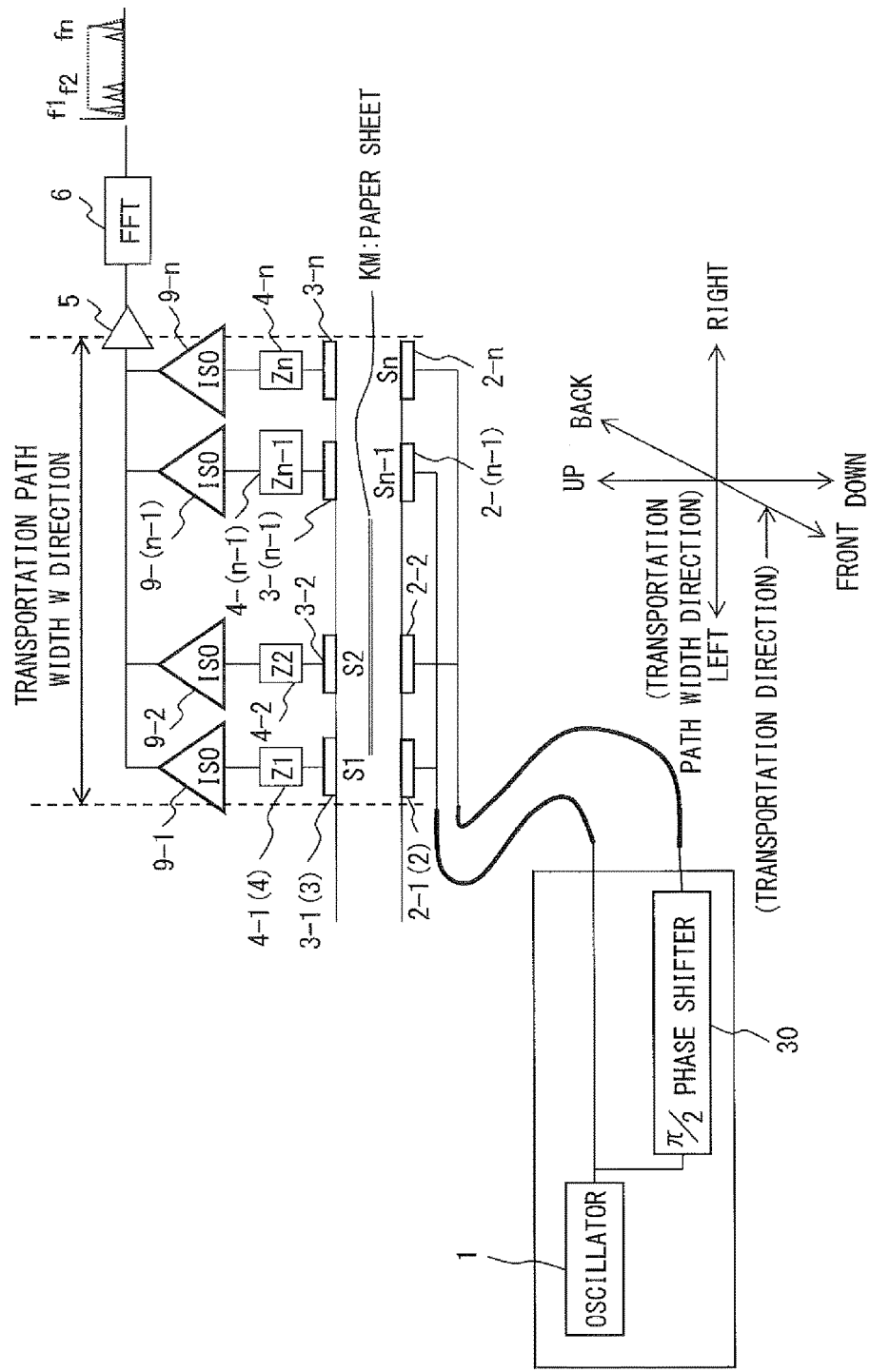
F I G. 6

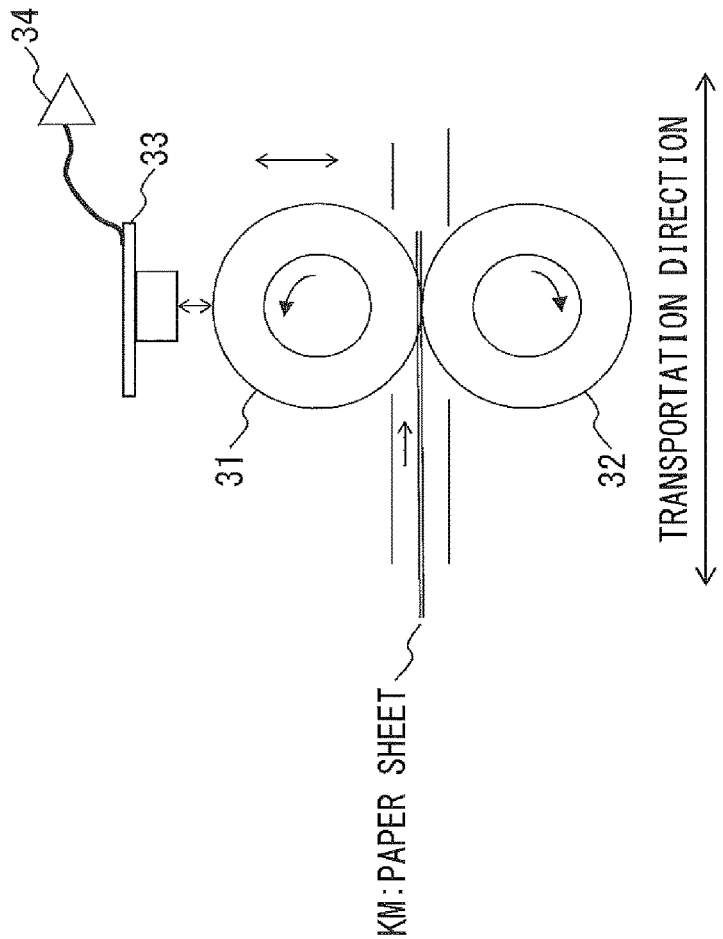
(a) MAIN COMPONENTS OF EXEMPLARY CONVENTIONAL PAPER-SHEET-THICKNESS DETECTING SENSOR
F I G. 7 A

PAPER SHEET THICKNESS DETECTING SENSOR AND BANKNOTE CLASSIFYING UNIT

CROSS-REFERENCE TO RELATED APPLICATIONS

This application is a continuation of PCT application PCT/JP2015/062376 which was filed on Apr. 23, 2015, the entire contents of which are incorporated herein by reference.

FIELD

The present invention relates to a paper sheet thickness detecting sensor and a banknote classifying unit.

BACKGROUND

An automatic transaction apparatus has held therein a banknote classifying unit that includes a thickness detecting sensor that detects the thickness of a banknote. The banknote is classified by determining feature values of the banknote. The thickness value of the banknote is one of the feature values. The thickness value of a banknote is detected to determine the presence of multi-feeding or adhesion of a foreign body.

FIG. 7A illustrates an example of a conventional paper sheet thickness detecting sensor. Inserting a paper sheet KM between a fixed roller 32 and a detection roller 31, which is in intimate contact with the fixed roller 32 owing to a pressure from a shaft, shifts the detection roller 31 by an amount that corresponds to the thickness of the paper sheet KM. This shift amount is detected by shift sensors 33 and amplified to a predetermined level by an amplifier 34. The physical thickness can be determined, and the mechanism accuracy is expected to provide highly reliable information as feature information. The entirety of the surface of a paper sheet can be detected using a roller that is as wide as the paper sheet; however, when only a small number of shift sensors 33 are used, a mechanism is needed for slightly shifting the entirety of the detection roller 31, and it is difficult to provide such a mechanism. Providing multiple detection rollers 31 enables detection of the thickness of the entirety of a paper sheet, but this is unsuitable for providing a multichannel configuration due to the limitations of the size of the mechanism. Moreover, due to the mechanical structure, a jam fault, such as clogging by wastepaper, can easily occur.

FIG. 7B illustrates another example of a conventional paper sheet thickness detecting sensor. A transportation roller 42 transports a paper sheet KM in the direction indicated by an arrow to a place facing, across a transportation path, a plurality of detection electrodes 44a, 44b, 44c, and 44d and a signal electrode 43 to which a high-frequency signal with a predetermined frequency from an oscillator 41 is applied. To precisely detect the thickness of the paper sheet KM in a transportation path width direction of the transportation path, a plurality of amplifiers 45a, 45b, . . . , 45d are connected to the plurality of detection electrodes 44a, 44b, 44c, and 44d. Individual signals amplified by the plurality of amplifiers 45a, 45b, . . . , 45d are input to a multiplexer 46, and information on the output levels of the amplifiers 45a, 45b, . . . , 45d is converted from parallel data to serial data. An impedance between the electrodes is detected that changes in accordance with whether a paper sheet KM is on the transportation path and with the thickness of the paper sheet KM. The impedance is detected as another physical value that is different from thickness, and hence the detected information should not be easily trusted; however, the entirety of the surface of the paper sheet can be detected by disposing many detection electrodes 44 without providing a mechanism for the detection. This allows a multichannel configuration to be readily achieved and makes a jam fault unlikely to occur, in comparison with a method in which a plurality of detection rollers 31 are used. The conventional paper sheet thickness detecting sensor depicted in FIG. 7B detects the thickness of a paper sheet KM that corresponds to the position of detection electrodes in the width direction of the transportation path using the level of a high-frequency signal with a predetermined frequency, and thus needs as many amplifiers as the number of detection electrodes.

Patent document 1 below proposes a method of detecting the thickness of a paper sheet by detecting a change in an AC magnetic field generated by a plurality of detection coils provided above a plurality of detection rollers arranged with no gaps therebetween. Patent document 2 below proposes a method wherein a plurality of detection electrode systems are arranged in a direction crossing the direction of scanning of a paper medium, the detection electrode of each system is connected to an independent resonator, and an oscillatory frequency signal from a common oscillation circuit is applied to the resonators, so as to measure the thickness of the paper medium.

Patent document 1: Japanese Laid-open Patent Publication No. 2012-160060
Patent document 2: Japanese Laid-open Patent Publication No. 05-052504

However, in the conventional method depicted in FIG. 7B, i.e., a method of detecting the thickness of a paper sheet KM using a high-frequency signal, increasing the number of detection electrodes that sandwich the paper sheet KM with the signal electrode for the purpose of improving the resolution ability for thickness detection of the paper sheet KM leads to the need to provide an amplifier 45 for each of the plurality of detection electrodes and to install wiring for the amplifiers 45. Hence, increasing the resolution ability in the conventional method of detecting the thickness of a paper sheet KM using a high-frequency signal results in increased material costs and an increase in the fabrication cost due to the wiring.

SUMMARY

A paper-sheet-thickness detecting sensor in accordance with a first aspect of the present invention includes: an oscillator that outputs high-frequency signals with frequencies allocated to positions in a horizontal direction that is orthogonal to a direction in which a paper sheet is transported; a signal electrode to which the high-frequency signals output by the oscillator are applied; a plurality of detection electrodes that face the signal electrode across a transportation path for the paper sheet and that individually detect detection signals that correspond to the positions; a plurality of resonance circuits that each have one end connected to one end of each of the plurality of detection electrodes and that have resonance frequencies equal to the frequencies allocated to the positions; and a broadband amplifier to which another end of each of the plurality of resonance circuits is connected and that outputs outputs of the plurality of resonance circuits as one piece of sensor output information.

A banknote classifying unit in accordance with a second aspect includes the paper-sheet-thickness detecting sensor.

The paper-sheet-thickness detecting sensor and the banknote classifying unit of the present invention include: an oscillator that outputs high-frequency signals with frequencies allocated to positions in a horizontal direction that is orthogonal to a direction in which a paper sheet is transported; a signal electrode to which the high-frequency signals output by the oscillator are applied; a plurality of detection electrodes that face the signal electrode across the paper sheet and that individually detect detection signals that correspond to the positions; a plurality of resonance circuits that each have one end connected to one end of each of the plurality of detection electrodes and that have resonance frequencies allocated to the positions; and an amplifier to which another end of each of the plurality of resonance circuits is connected and that outputs outputs of the plurality of resonance circuits as one piece of sensor output information. The amplifier outputs outputs of the plurality of resonance circuits as one piece of sensor output information. This allows the paper-sheet-thickness detecting sensor and the banknote classifying unit to have an improved resolution ability for thickness detection of a paper sheet while minimizing the material costs and the fabrication cost for wiring.

It is to be understood that both the forgoing general description and the following detailed description are exemplary and explanatory and are not restrictive of the invention.

BRIEF DESCRIPTION OF DRAWINGS

FIG. 5 illustrates the configuration of a paper-sheet-thickness detecting sensor in accordance with a second embodiment of the invention;

FIG. 6 illustrates the configuration of a paper-sheet-thickness detecting sensor in accordance with a variation of a second embodiment of the invention; and FIGS. 7A and 7B illustrate the configuration and operation of main components of a conventional paper-sheet-thickness detecting sensor.

DESCRIPTION OF EMBODIMENTS

Figure 1:
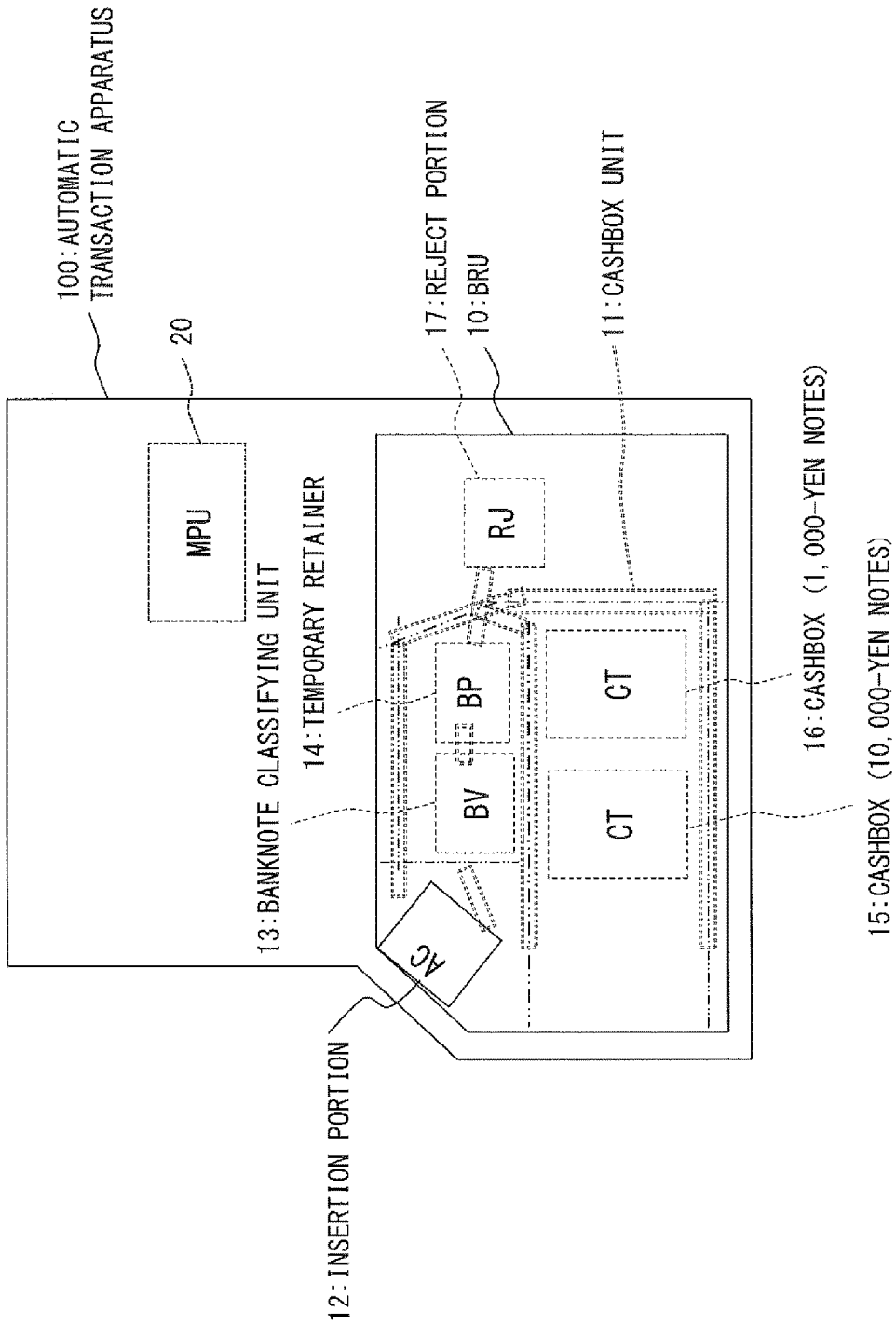
FIG. 1 is a schematic view of the configuration of an automatic transaction apparatus that includes a banknote classifying unit of the present invention.

The following describes embodiments of the invention in detail by referring to the drawings.
(Configuration of Automatic Transaction Apparatus in Accordance with Embodiment)

FIG. 1 is a schematic view of the configuration of an automatic transaction apparatus that includes a banknote classifying unit of the present invention.

An automatic transaction apparatus 100 such as an ATM (automated teller machine) includes: a BRU (Bill Recycle Unit) 10 that temporarily retains, returns, or puts an entered banknote into a cashbox; and an MPU 20 that controls the entirety of the apparatus. The BRU 10 includes a cashbox unit 11 and a reject portion 17 that has stored therein 5,000-yen notes and 2,000-yen notes, which are not used in a money returning process, and damaged banknotes that cannot be used in the money returning process.

The cashbox unit 11 includes an insertion portion 12 into which a banknote is inserted, a banknote classifying unit 13 that identifies a banknote, a temporary retainer 14 that temporarily retains the banknote, a cashbox (10,000-yen notes) 15, and a cashbox (1,000-yen notes) 16. The banknote classifying unit 13 has a paper-sheet-thickness detecting sensor installed therein.
(Paper-Sheet-Thickness Detecting Sensor in Accordance with First Embodiment)

Figure 2:
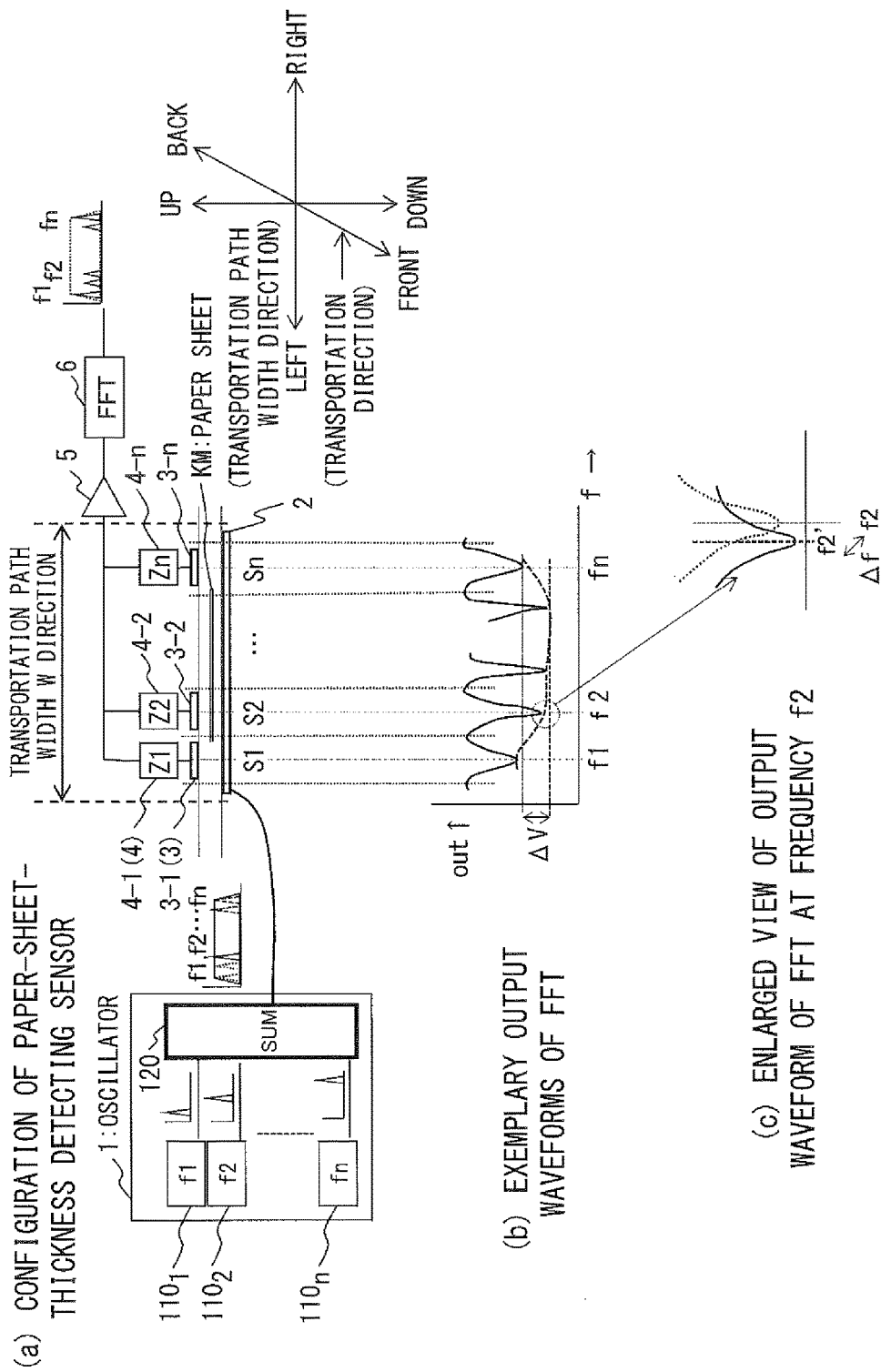
FIG. 2 is an explanatory diagram for the configuration and operation of a paper-sheet-thickness detecting sensor in accordance with a first embodiment of the invention.

(a) to (c) in FIG. 2 illustrate the configuration and operation of a paper-sheet-thickness detecting sensor in accordance with a first embodiment of the invention.

(a) in FIG. 2 illustrates the configuration of the paper-sheet-thickness detecting sensor in accordance with the first embodiment of the invention. (b) in FIG. 2 illustrates an exemplary output waveform of an FFT 6. (c) in FIG. 2 is an enlarged view of the waveform for frequency f2 in (b) in FIG. 2.

In (a) in FIG. 2, a thickness detecting sensor for paper sheets KM includes an oscillator 1, a signal electrode 2, a plurality of detection electrodes 3-1, 3-2, . . . , 3-$n$, a plurality of resonance circuits 4-1, 4-2, . . . , 4-$n$, an amplifier 5, and an FFT (Fast Fourier Transform) 6. In (a) in FIG. 2, a paper sheet KM is transported in a direction from the front side to the back side of the figure.

The oscillator 1 includes: oscillation circuits 110 ($110_1$, $110_2$, . . . , $110_n$) that individually output high-frequency signals of a certain level with frequencies f1, f2, . . . , fn allocated to positions S1, S2, . . . , Sn in a horizontal direction (transportation path width W direction) that is orthogonal to a direction in which the paper sheet KM is transported; and an adder 120 that sums high-frequency signals with frequencies f1, f2, . . . , fn. The oscillator 1 outputs discrete high-frequency-signal groups of a certain level with frequencies f1, f2, . . . , fn.

An output of the oscillator 1 guided to the signal electrode 2 via a high-frequency transmission channel. The signal electrode 2 consists of a metal plate or the like, has a width that is greater than the width of a paper sheet KM transported in a direction from the front side to the back side of (a) in FIG. 2 (from the front to the back in (a) in FIG. 2), and extends in a direction from the front side to the back side of (a) in FIG. 2 (from the front to the back in the figure).

A plurality of detection electrodes 3-1, 3-2, . . . , 3-$n$ are provided that face the signal electrode 2 across a transportation path for transporting paper sheets KM. The detection electrodes 3-1, . . . , 3-$n$ consist of, for example, square metal pieces. The resonance circuits 4-1, . . . , 4-$n$ are respectively connected to the detection electrodes 3-1, . . . , 3-$n$.

The resonance circuit 4 may be represented as a parallel resonance circuit of an inductance L, a capacitor C, and a resistor R. The resonance frequencies of the resonance circuits 4-1, 4-2, . . . , 4-$n$ are set to f1, f2, . . . , fn. Constants of the inductance L, the capacitor C, and the resistor R are determined as a parallel resonance circuit that includes an impedance formed between the signal electrode 2 and the detection electrode 3. The parallel resonance circuit corresponds to detection positions S1 to Sn associated with frequencies f1 to fn; and frequencies f1, f2, . . . , fn, which are different from each other, are selected without departing from the frequency band of the oscillator 1.

When discrete high-frequency-signal groups of a certain level with frequencies f1, f2, . . . , fn are applied to the signal electrode 2, a signal with a resonance frequency is output to each of the detection electrodes 3-1, 3-2, ..., 3-n connected to the resonance circuits 4 with resonance frequencies having been set to f1, f2, ..., fn. In this situation, some of the plurality of detection electrodes 3 sandwich the paper sheet KM with the signal electrode 2, and the others of the plurality of detection electrodes 3 do not sandwich the paper sheet KM with the signal electrode 2. There is a difference in level of detected voltage between the detection electrodes 3 sandwiching the paper sheet KM with the signal electrode 2 and the other detection electrodes 3. The thickness of the paper sheet KM can be calculated from the difference in level.

The amplifier 5 is a broadband amplifier that nearly flatly amplifies at least frequencies that fall within the range of frequencies f1 to fn (f1<f2< ... <fn); and, in theory, the amplifier 5 only needs to have a bandwidth that is equal to or greater than a bandwidth of f1 to f1+Δf×n, which will be described hereinafter.

The FFT 6, which is an algorithm for fast calculation of discrete Fourier transform on a computer, consists of a general DSP, a dedicated LSI, or the like.

(b) in FIG. 2 depicts an exemplary output waveform of the FFT 6. (c) in FIG. 2 is an enlarged view of the waveform for frequency f2 in (b) in FIG. 2. ΔV in the output waveform of the FFT 6 depicted in (b) in FIG. 2 indicates the difference in detected voltage between a detection electrode 3 that is sandwiching a paper sheet KM with the signal electrode 2 and a detection electrode 3 that is not sandwiching the paper sheet KM with the signal electrode 2, and corresponds to the thickness of the paper sheet KM. According to (c) in FIG. 2, the oscillatory frequency is changed from f2 to f2', i.e., changed by Δf, as a result of the paper sheet KM being sandwiched between the signal electrode 2 and the detection electrode 3. Δf indicates the amount of change in the resonance frequency that is caused by the paper sheet KM being sandwiched; the thickness of the paper sheet KM may be determined from Δf, i.e., the amount of change in the resonance frequency.

Inserting a medium such as a paper sheet Km between electrodes changes a permittivity between the electrodes. With the change in the permittivity, an impedance formed between the signal electrode 2 and the detection electrode 3 is varied. The resonance circuit 4 connected to the detection electrode 3 has set therefor a resonance frequency determined in the absence of a medium; hence inserting a medium between the signal electrode 2 and the detection electrode 3 varies the impedance that forms the resonance circuit, with the result that the resonance frequency deviates from the original.

Descriptions will be given of the principle of the thickness detection in the following. Let d indicate the interval between the signal electrode 2 and the detection electrode 3; S, the area of the surface of the detection electrode 3; ε, the permittivity of air; $\varepsilon_r$, the specific permittivity of the paper sheet KM. When the paper sheet KM has not been inserted, $C_0 = \varepsilon \cdot S/d$ is satisfied, where $C_0$ indicates the capacitance of a capacitor formed by the signal electrode 2 and the detection electrode 3. When the paper sheet KM has been inserted, $C_{KM} = \varepsilon \cdot \varepsilon_r \cdot S/d$ is satisfied, where $C_{KM}$ indicates the capacitance of the capacitor formed by the signal electrode 2 and the detection electrode 3.

$Z_0 = 1/j\omega C_0 = 1/j2\pi f\varepsilon \cdot S/d$ is satisfied, where f indicates the frequency of a high-frequency signal applied to the signal electrode 2, and $Z_0$ indicates the impedance of the capacitor formed by the signal electrode 2 and the detection electrode 3 when the paper sheet KM has not been inserted. Meanwhile, $Z_{KM} = 1/j\omega C_{KM} = 1/j2\pi f\varepsilon \cdot \varepsilon_r \cdot S/d$ is satisfied, where $Z_{KM}$ indicates the impedance of the capacitor formed by the signal electrode 2 and the detection electrode 3 when the paper sheet KM has been inserted. When the specific permittivity $\varepsilon_r$ is a real number, the output level relative to an applied frequency signal is changed in accordance with whether the paper sheet KM has been inserted. When the specific permittivity $\varepsilon_r$ is a complex number, both the phase and the output level relative to an applied frequency signal are changed in accordance with whether the paper sheet KM has been inserted.

Actually, in factory shipping of the banknote classifying unit that includes the thickness detecting sensor, calibration is performed in both a situation in which a paper sheet KM has not been inserted and a situation in which a paper sheet KM has been inserted; information indicating the voltage/current and the amount of change in resonance frequency that result from an impedance variation that depends on whether the paper sheet KM has been inserted, is stored in a memory (not illustrated); the thickness of the paper sheet KM is detected from the information stored in the memory, i.e., from the information indicating whether the paper sheet KM has been inserted and the information indicating the voltage/current, or from the information indicating whether the paper sheet KM has been inserted and the information indicating the amount of change in resonance frequency.

Outputs of the individual detection electrodes 3 are sent via the resonance circuits 4, collected by a signal line, and input to the amplifier 5. When signal analysis of the output level is performed for each frequency by the FFT 6 after the amplifier 5 has amplified the outputs to a required voltage or current level, a difference in output level (a difference in voltage or current) is seen for each frequency between the position affected by the medium and the position unaffected by the medium. Obtaining a difference in signal output level or the amount of change in resonance frequency allows multichannel medium information, such as the thickness, to be obtained in accordance with one output of the FFT 6.

(Paper-Sheet-Thickness Detecting Sensor in Accordance with a Variation of First Embodiment)

Figure 3:
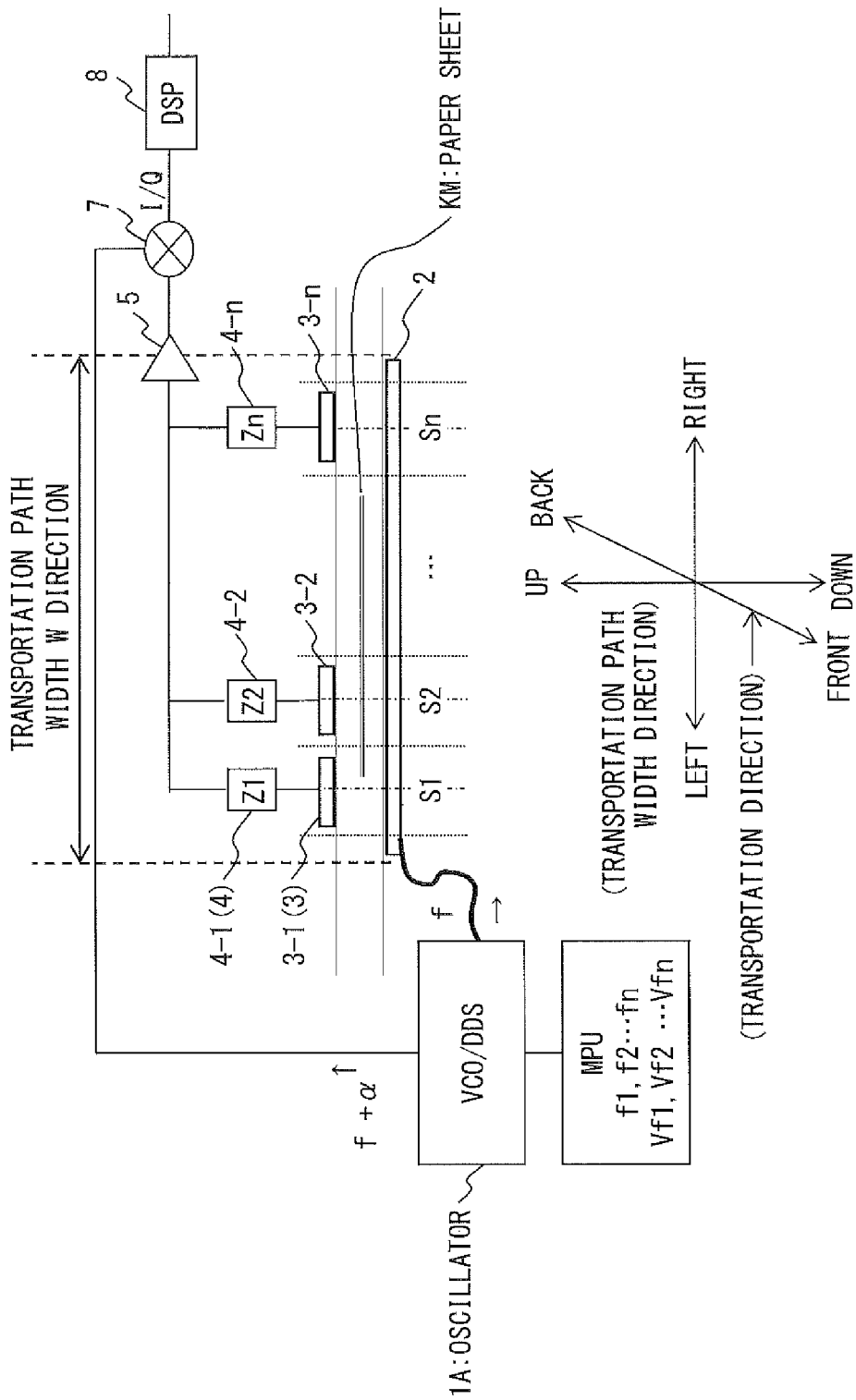
FIG. 3 illustrates the configuration of a paper-sheet-thickness detecting sensor in accordance with a variation of a first embodiment.
Figure 4A:
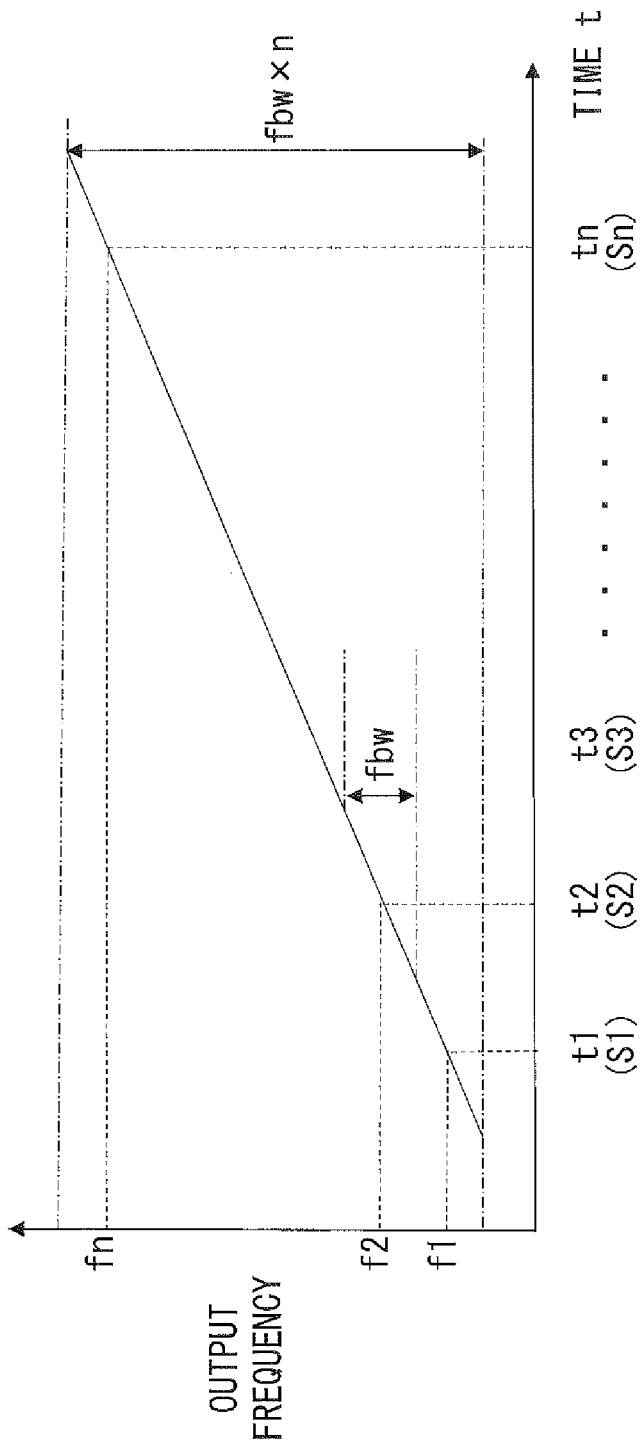
FIGS. 4A, 4B and 4C illustrate exemplary changes in an oscillatory frequency and exemplary output waveforms of a DSP for illustrating the operation of FIG. 3.
Figure 4B:
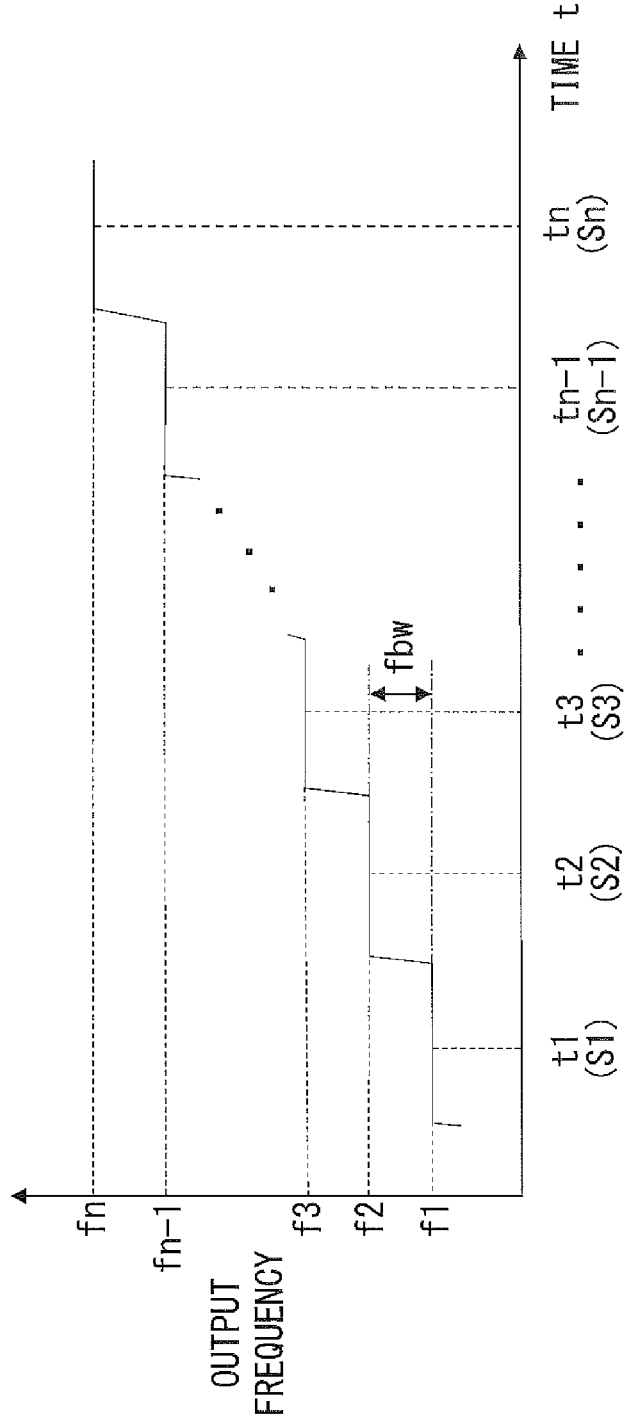
Figure 4C:
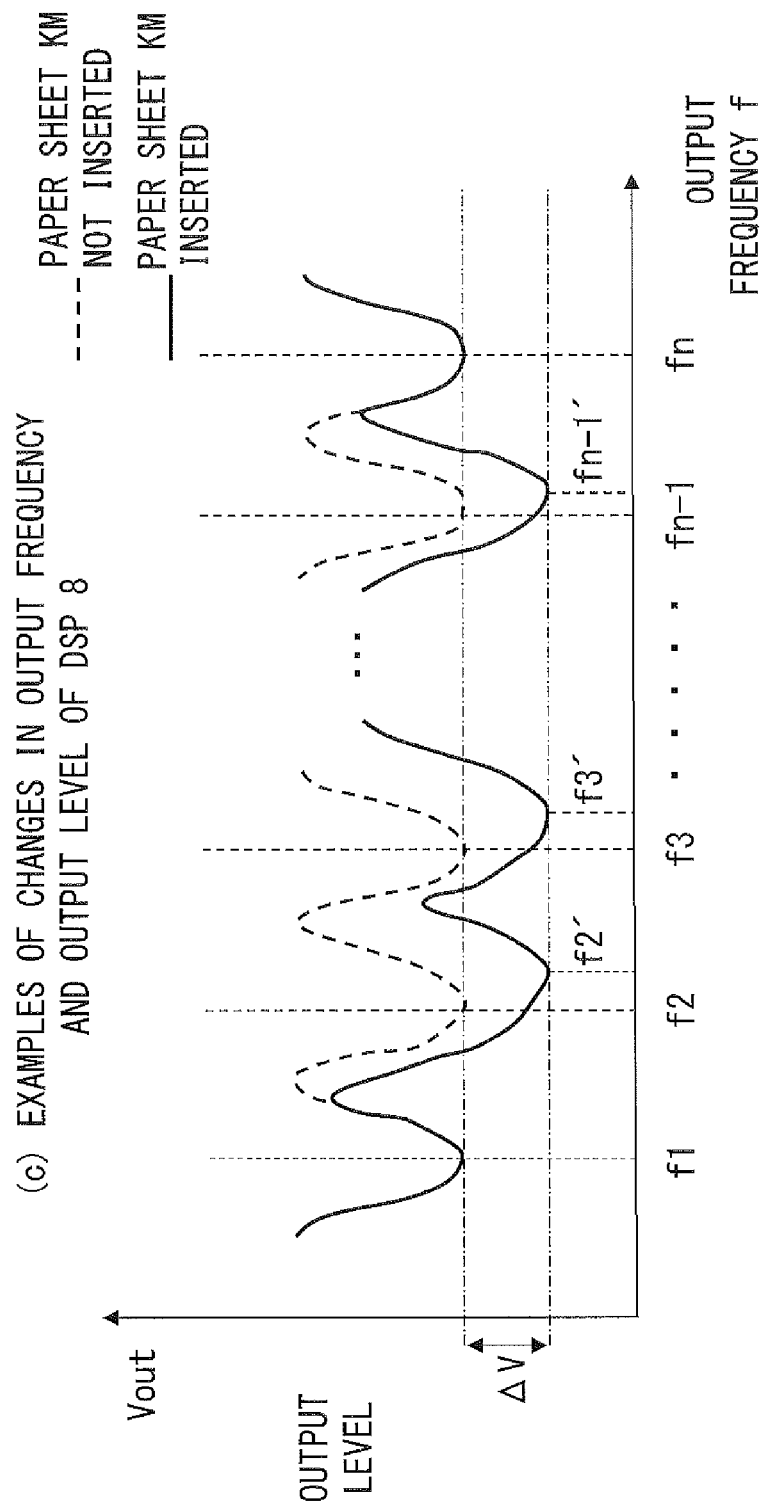

(a) in FIG. 3 illustrates the configuration of a paper-sheet-thickness detecting sensor in accordance with a variation of the first embodiment. In (a) in FIG. 3, like components are given like reference marks to those depicted in FIG. 2, which depicts the first embodiment. FIG. 4A and FIG. 4B illustrate exemplary changes in the frequency of a high-frequency signal of an oscillator 1A for illustrating the operation of FIG. 3. FIG. 4C illustrates exemplary changes in the output frequency and the output level of the DSP 8 depicted in FIG. 3.

In FIG. 3, a thickness detecting sensor for paper sheets KM in accordance with a variation of the first embodiment includes a digital-method-based voltage controlled oscillator 1A (VCO/DDS; hereinafter referred to as an "oscillator"), not the oscillator 1 depicted in FIG. 2. The oscillator 1A outputs a high-frequency signal with a frequency continuously changed to frequencies f1, f2, ..., fn allocated in accordance with elapsed times t1, t2, ..., tn that correspond to positions S1, S2, ..., Sn in a horizontal direction (transportation path width W direction) that is orthogonal to a direction in which a paper sheet KM is transported. The high-frequency signal output by the oscillator 1A has a frequency range that includes, as the center thereof, a parallel resonance frequency of one resonance circuit 4 connected to a detection electrode 3 and that is wider than fbw, which is a frequency band such that a change in a physical amount caused by insertion of a medium such as a paper sheet KM can be dealt with (see FIG. 4A). The frequency of the high-frequency signal output by the oscillator 1A is variable along a temporal axis, and a signal with a frequency band that is wider than a bandwidth of n×fbw, i.e., the frequency band fbw multiplied by n, which indicates the number of used channels, is generated in response to an instruction from an external controller MUP. A sweep time from a minimum frequency to a maximum frequency is controlled by the controller MUP at a rate that is sufficiently higher than a rate at which the medium is transported.

In consideration of errors in the mechanism of electrodes or the like and errors in circuit components, an oscillatory frequency and the degree of an output level are determined for each detection position in the absence of a medium so that they can become uniform at an input point of the amplifier 5, adjusted values are stored in a memory (not illustrated), and the output level of the oscillator 1A is controlled together with the frequency.

Output ends of the resonance circuits 4-1, 4-2, ..., 4-n are collected by a printed circuit board (not illustrated) and connected to one input end of a mixer circuit 7. Another input end of the mixer circuit 7 has supplied thereto a signal with a frequency of f+α, which is slightly different from f, which is a frequency supplied to the signal electrode 2. The mixer circuit 7 outputs and supplies, to the DSP 8, a low frequency of α, which is the difference between the two input frequencies of f and f+α.

During insertion of a medium, the medium changes the permittivity between electrodes and thus changes the oscillatory frequency. Due to the characteristic of a parallel resonance frequency, when there is a difference from the center frequency determined in the absence of a medium, the impedance of the resonance circuit 4 is changed, thereby changing the output level of signals from the mixer circuit 7. The amount of change in the output level may be used directly as a thickness value.

Performing signal processing to detect the oscillatory frequency after the change enables detection of an output frequency that is different from an output frequency achieved in the absence of a medium, so that the amount of change in the permittivity can be detected from the amount of change in the output frequency. When it is difficult to make the determination using the signal output level, the determination may be readily made by detecting the amount of change in the output frequency, and the signal processing may be facilitated through frequency conversion performed by the mixer circuit 7.

Referring to FIG. 4B, the output frequency becomes f1, f2, ..., tn in a step-wise pattern with elapsing of times t1, t2, ..., tn.

Referring to FIG. 4C, which illustrates an exemplary output waveform of the DSP 8 depicted in FIG. 3, the output frequency of a detection electrode 3 sandwiching the paper sheet KM with the signal electrode in FIG. 3, e.g., the detection electrode 3-2, is changed from f2 to f2'. According to this change, the thickness of the paper sheet KM is detected from Δf=f2'−f2. The other operations are similar to those of the thickness detecting sensor for paper sheets KM in accordance with the first embodiment of the invention.
(Paper-Sheet-Thickness Detecting Sensor in Accordance with Second Embodiment)

FIG. 5 illustrates the configuration of a paper-sheet-thickness detecting sensor in accordance with a second embodiment of the invention. In FIG. 5, like components are given like reference marks to those depicted in FIG. 2, which depicts the first embodiment.

The thickness detecting sensor for paper sheets KM in accordance with the second embodiment of the invention includes the oscillator 1 depicted in FIG. 2 with a π/2 phase shifter 30 added thereto. The π/2 phase shifter 30 may obtain various phase-shifted signals using, for example, a plurality of digital flip-flops (D-ffs) and a frequency that is four times that of a high-frequency signal applied to the signal electrode 2. The phase-shifted signals may be obtained by varying the original oscillatory frequency.

The thickness detecting sensor also includes a plurality of signal electrodes 2-1, 2-2, ..., 2-n, not the signal electrode 2 depicted in FIG. 2. The output from the oscillator 1 is applied to the signal electrodes identified by odd numbers, i.e., the signal electrodes 2-1, 2-3, ..., 2-n, and the output from the oscillator 1 with a π/2 phase shift applied thereto is applied to the signal electrodes identified by even numbers, i.e., the signal electrodes 2-2, 2-4, .... In the other respects, the configuration is similar to that depicted in (a) in FIG. 2.

In the configuration depicted in FIG. 5, the phases of the signals applied to adjacent signal electrodes, e.g., the signal electrodes 2-1 and 2-2 or the signal electrodes 2-2 and 2-3, are different from each other by π/2. Accordingly, even though the signal electrodes 2-1, 2-2, and 2-3 have applied thereto frequencies f1, f2, and f3, which are close to each other, the adjacent frequencies can be prevented from interfering with each other, owing to the difference of π/2 in phase between the adjacent frequencies. Hence, the number of signal electrodes 2 may be increased to detect the thickness of the entirety of a paper sheet KM with improved accuracy in thickness detection. Owing to the reduction of the adjacency interference, the range from f1 to fn may be made narrow, and thus the amplifier 5 only needs to have a narrow bandwidth.

FIG. 6 illustrates the configuration of a paper-sheet-thickness detecting sensor in accordance with a variation of the second embodiment of the invention. In FIG. 6, like components are given like reference marks to those depicted in FIG. 5, which depicts the second embodiment.

Referring to FIG. 6, the DSP 8 and a set of the plurality of resonance circuits 4-1, 4-2, ..., 4-n depicted in FIG. 5 have as many isolation buffers 9-1, 9-2, ..., 9-n as the number of the resonance circuits 4 inserted therebetween. In the other respects, the configuration is similar to that depicted in FIG. 5. The isolation buffer 9-1, which is a one-way element, amplifies a signal input from the base of the triangle and outputs the amplified signal in the direction of the top vertex of the triangle, but does not allow propagation of a signal in a direction from the top vertex to the base of the triangle.

In the configuration depicted in FIG. 6, the interference of the detected voltages of, for example, the adjacent electrodes 3-1 and 3-2 may be decreased; the number of signal electrodes 2 may be increased to improve the accuracy in detection of the thickness of a paper sheet KM so that the thickness of the entirety of the paper sheet KM can be accurately detected.

Effect of Embodiment

The paper-sheet-thickness detecting sensor in accordance with the first embodiment of the invention includes: an oscillator 1 that outputs high-frequency signals with frequencies that correspond to positions in a horizontal direction (transportation path width W direction) that is orthogonal to a direction in which a paper sheet is transported; a signal electrode 2 to which the high-frequency signals output by the oscillator 1 are applied; a plurality of detection electrodes 3-1 to 3-*n* that face the signal electrode 2 across the paper sheet KM and that each detect a detection signal that corresponds to a position; a plurality of resonance circuits 4-1 to 4-*n* that each have one end connected to one end of each of the plurality of detection electrodes 3-1 to 3-*n* and that have a resonance frequency equal to a frequency that corresponds to a position; and a broadband amplifier 5 to which another end of each of the plurality of resonance circuits 4-1 to 4-*n* is connected and that outputs output signals of the plurality of resonance circuits 4-1 to 4-*n* as one piece of sensor output information. Unlike in the case of the conventional example depicted in FIG. 7B, in which a plurality of amplifiers 45*a*, 45*b*, ..., 45*d* need to be provided, only one broadband amplifier 5 is used, thereby simplifying the wiring. Accordingly, while minimizing the material costs and the fabrication cost for wiring, the thickness of a paper sheet can be detected for each position in a horizontal direction (transportation path width W direction) that is orthogonal to a direction in which the paper sheet is transported.

The paper-sheet-thickness detecting sensor in accordance with a variation of the first embodiment of the invention includes an oscillator 1A, the oscillator A storing a frequency and an output level of a high-frequency signal achieved when a paper sheet KM has been detected, and applying a high-frequency signal with the stored frequency and output level to a signal electrode 2, so as to compensate for an error between a plurality of detection electrodes 3 and an error between a plurality of resonance circuits 4. This compensates for the error between a plurality of detection electrodes 3 and the error between a plurality of resonance circuits 4 so that the thickness of a paper sheet can be more accurately detected for each position in a horizontal direction that is orthogonal to a direction in which the paper sheet is transported.

The paper-sheet-thickness detecting sensor in accordance with the second embodiment of the invention is configured in a manner such that adjacent signal electrodes 2 have applied thereto high-frequency signals whose phases are different from each other by π/2 rad. The difference of π/2 rad in phase between the high-frequency signals applied to adjacent signal electrodes reduces interference of the adjacent signal electrodes. This allows the thickness of the entirety of a paper sheet to be detected with an improved accuracy for each position in a horizontal direction (transportation path width W direction) that is orthogonal to a direction in which the paper sheet is transported.
(Variation)

Figure 7B:
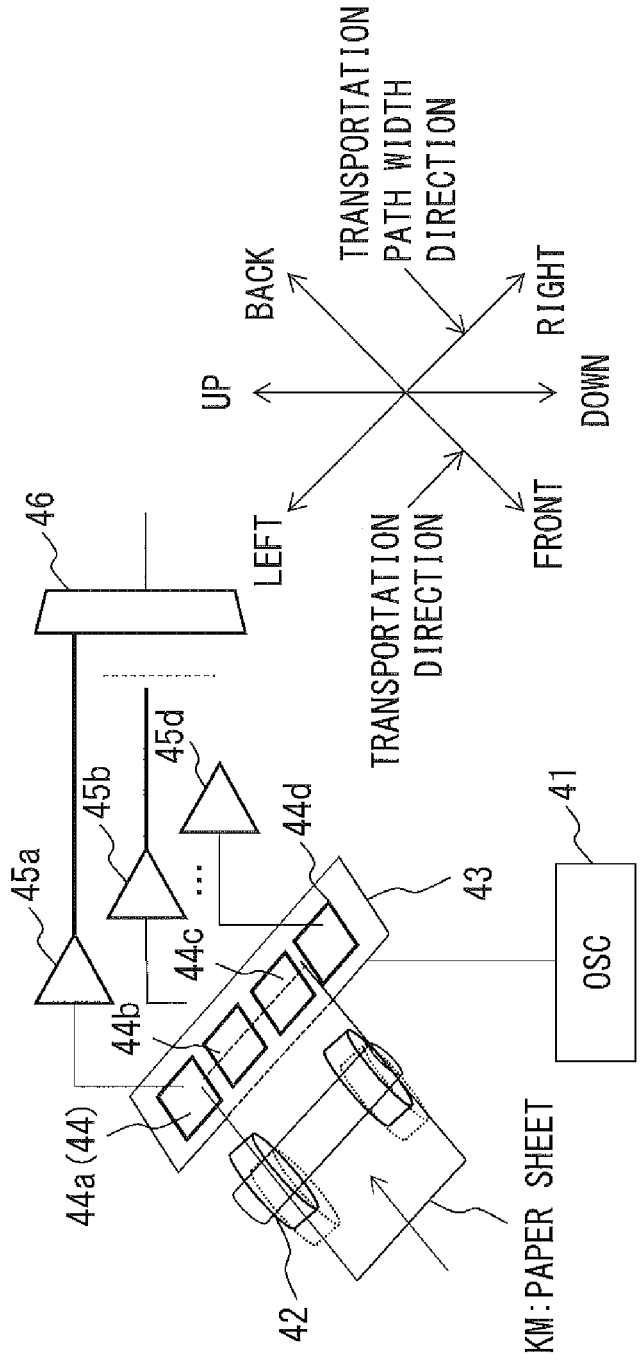

The paper-sheet-thickness detecting sensors in accordance with the first and second embodiments of the invention have been described as an improvement of the configuration depicted in FIG. 7B, which illustrates a conventional example; however, the invention may be applied as an improvement of the configuration depicted in FIG. 7A, which illustrates another conventional example. In particular, with reference to FIG. 7A, in a case where a plurality of detection rollers 31, shift sensors 33, and amplifiers 34 are arranged in a horizontal direction that is orthogonal to a direction in which a paper sheet is transported, the plurality of amplifiers 34 may be replaced with one broadband amplifier 5 to minimize the material costs and the fabrication cost for wiring.

According to the descriptions of the paper-sheet-thickness detecting sensor in accordance with the first and second embodiments of the invention, the resonance circuit 4 may be represented as a parallel resonance circuit of an inductance L, a capacitor C, and a resistor R. However, the resonance circuit 4 is not limited to a parallel resonance circuit. The resonance circuit 4 may be a series resonance circuit of an inductance L, a capacitor C, and a resistor R; as long as the resonance circuit 4 includes, as resonance parameters, the electrode 3 and a capacitor that includes the electrode 3, the resonance circuit 4 may have any configuration. The impedance of the series resonating frequency resonance circuit is decreased while a paper sheet KM is not inserted. A paper sheet KM being located between the electrodes increases the impedance of the resonance circuit in comparison with an impedance that would be achieved in the absence of a paper sheet KM between the electrodes. As in the case of the resonance circuit 4 formed as a parallel resonance circuit, a medium can be detected as a difference in output level (difference in voltage or current). The resonance frequency is also shifted so that the thickness of a paper sheet KM can be determined from Δf, i.e., the amount of change in the resonance frequency. The impedance of the parallel resonance circuit changes in a direction that is opposite to a direction in which the impedance of the series resonance circuit changes; however, detected final results can be freely reversed in accordance with an input mode for the amplifier circuit and a method for signal processing. In relation to this, (b) in FIG. 2 and FIG. 4C depict exemplary output waveforms.

The paper-sheet-thickness detecting sensors in accordance with the first and second embodiments of the invention detect an impedance between electrodes that is changed by a medium sandwiched between the electrodes, and thus can be used to detect threads, or a swath of metal, on some non-Japanese banknotes.

Embodiments of the present invention have been described, but the invention is not limited to the embodiments described above. The present invention can have various configurations or embodiments without departing from the spirit of the invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A paper-sheet-thickness detecting sensor comprising:
an oscillator that outputs high-frequency signals with frequencies allocated to positions in a horizontal direction that is orthogonal to a direction in which a paper sheet is transported;
a signal electrode to which the high-frequency signals output by the oscillator are applied;
a plurality of detection electrodes that face the signal electrode across a transportation path for the paper sheet and that individually detect detection signals that correspond to the positions;
a plurality of resonance circuits that each have one end connected to one end of each of the plurality of detection electrodes and that have resonance frequencies equal to the frequencies allocated to the positions; and a broadband amplifier to which another end of each of the plurality of resonance circuits is connected and that outputs outputs of the plurality of resonance circuits as one piece of sensor output information.

2. The paper-sheet-thickness detecting sensor according to claim 1, wherein
the sensor output information is an amount of change in an output level of the detection signals.

3. The paper-sheet-thickness detecting sensor according to claim 1, wherein
the sensor output information is an amount of change in a frequency of the detection signals.

4. The paper-sheet-thickness detecting sensor according to claim 1, wherein
the frequencies of the high-frequency signals output by the oscillator are swept with times allocated to the positions.

5. The paper-sheet-thickness detecting sensor according to claim 1, wherein
the resonance circuit is a parallel resonance circuit that includes an inductance, a capacitor, and a resistor.

6. The paper-sheet-thickness detecting sensor according to claim 1, wherein
the resonance circuit is a series resonance circuit that includes an inductance, a capacitor, and a resistor.

7. The paper-sheet-thickness detecting sensor according to claim 5, wherein
the oscillator stores a frequency and an output level of the high-frequency signals achieved when the paper sheet has been detected, and applies a high-frequency signal with the stored frequency and output level to the signal electrode, so as to compensate for an error in a mechanism of the plurality of detection electrodes and an error in components of the resonance circuit.

8. The paper-sheet-thickness detecting sensor according to claim 6, wherein
the oscillator stores a frequency and an output level of the high-frequency signals achieved when the paper sheet has been detected, and applies a high-frequency signal with the stored frequency and output level to the signal electrode, so as to compensate for an error in a mechanism of the plurality of detection electrodes and an error in components of the resonance circuit.

9. The paper-sheet-thickness detecting sensor according to claim 1, wherein
adjacent signal electrodes have applied thereto high-frequency signals whose phases are different from each other by $\pi/2$ rad.

10. The paper-sheet-thickness detecting sensor according to claim 9, wherein
the broadband amplifier and a set of the plurality of resonance circuits have as many isolation buffers as a number of the resonance circuits inserted therebetween.

11. A banknote classifying unit that uses the paper-sheet-thickness detecting sensor according to claim 1.

* * * * *